(12) United States Patent
Yamamoto

(10) Patent No.: US 11,245,116 B2
(45) Date of Patent: Feb. 8, 2022

(54) ELECTRODE FOR SECONDARY BATTERY AND SECONDARY BATTERY

(71) Applicant: TOYOTA JIDOSHA KABUSHIKI KAISHA, Toyota (JP)

(72) Inventor: Yuji Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 16/585,277

(22) Filed: Sep. 27, 2019

(65) Prior Publication Data

US 2020/0112029 A1    Apr. 9, 2020

(30) Foreign Application Priority Data

Oct. 9, 2018   (JP) .............................. JP2018-190669

(51) Int. Cl.
*H01M 4/66* (2006.01)
*H01M 4/133* (2010.01)
*H01M 4/02* (2006.01)

(52) U.S. Cl.
CPC ........... *H01M 4/663* (2013.01); *H01M 4/133* (2013.01); *H01M 2004/028* (2013.01)

(58) Field of Classification Search
CPC ........ H01M 4/13; H01M 4/133; H01M 4/625; H01M 4/663; H01M 2004/028; H01M 10/0525; Y02E 60/10
See application file for complete search history.

(56) References Cited

U.S. PATENT DOCUMENTS

2014/0087268 A1*  3/2014  Kim ..................... H01M 4/386
                                                         429/231.8
2014/0295269 A1   10/2014  Mangolini et al.

FOREIGN PATENT DOCUMENTS

| CN | 106920941 A | 7/2017 |
| CN | 108091861 A | 5/2018 |
| JP | 5906578 B2  | 4/2016 |
| JP | 6136788 B2  | 5/2017 |

* cited by examiner

*Primary Examiner* — Brittany L Raymond
(74) *Attorney, Agent, or Firm* — Sughrue Mion, PLLC

(57) ABSTRACT

An electrode using a carbon nanotube as a conductive material and having a small resistance is provided. An electrode for a secondary battery disclosed herein has a collector, and an active material layer formed on the collector. The active material layer includes an active material and carbon nanotubes. Each of the carbon nanotube has a coating of a material including an element with a higher electronegativity than that of carbon on at least a part of the surface thereof.

8 Claims, 3 Drawing Sheets

ELECTRODE FOR SECONDARY BATTERY AND SECONDARY BATTERY

BACKGROUND OF THE INVENTION

1. Field of the Invention

The present teaching relates to an electrode for secondary battery. The present teaching also relates to a secondary battery including the electrode. The present application claims the benefit of foreign priority to Japanese Patent Application No. 2018-190669, filed on Oct. 9, 2018, which is incorporated by reference in its entirety.

2. Description of the Related Art

In recent years, a secondary battery such as a lithium ion secondary battery has been suitably used for a portable power source for a personal computer, a portable terminal, or the like; a vehicle driving power source for an electric vehicle (EV), a hybrid vehicle (HV), a plug-in hybrid vehicle (PHV), or other vehicles; or the like.

An electrode for use in a secondary battery such as lithium ion secondary battery typically has a configuration in which an active material layer is provided on a collector. There is a known technique in which a conductive material is added in an active material layer in order to enhance the electron conductivity of the active material layer.

Japanese Patent No. 6136788 describes that use of a carbon nanotube s a conductive material can improve the electron conductivity of the active material layer even if the added amount of the carbon nanotube is small.

SUMMARY OF THE INVENTION

A secondary battery such as a lithium ion secondary battery has been required to have further smaller resistance. The present inventor has conducted an intensive study to meet such a requirement, and as a result, found that, although in the conventional art, the electron conductivity improving effect by the carbon nanotube can provide some degree of resistance reducing effect; there is still room for improvement for achieving further smaller resistance.

Under such circumstances, it is an object of the present teaching to provide an electrode using a carbon nanotube for a conductive material and having a small resistance.

An electrode for secondary battery disclosed herein has a collector, and an active material layer formed on the collector. The active material layer includes an active material and carbon nanotubes. Each of the carbon nanotubes has coating of a material including an element with a higher electronegativity than that of carbon on at least a part of the surface.

With such a configuration, it is possible to provide an electrode using carbon nanotubes for a conductive material and having a small resistance.

In accordance with a desired aspect of the electrode for secondary battery disclosed herein, the element with a higher electronegativity than that of carbon is at least one selected from the group consisting of F, N, and Cl.

With such a configuration, the resistance reducing effect becomes particularly high.

In accordance with a desired aspect of the electrode for secondary battery disclosed herein, the electrode for secondary battery is a positive electrode, and the active material is a positive electrode active material.

With such a configuration, the resistance reducing effect becomes particularly high.

In accordance with a desired aspect of the electrode for secondary battery disclosed herein, the average length of the carbon nanotubes is 50 μm or less.

With such a configuration, the resistance reducing effect becomes particularly high.

In accordance with a desired aspect of the electrode for secondary battery disclosed herein, the coating ratio of the surface of the carbon nanotubes by coating with a material including the element with a higher electronegativity than that of carbon is 40% or more and 70% or less.

With such a configuration, the resistance reducing effect becomes particularly high.

In accordance with a desired aspect of the electrode for secondary battery disclosed herein, each of the carbon nanotubes further has coating of a material including an element with a lower electronegativity than that of carbon.

With such a configuration, the resistance reducing effect becomes particularly high.

In a more desired aspect, the element with a lower electronegativity than that of carbon is at least one selected from the group consisting of Ti, P, B, Si, Al, Zn, and W.

With such a configuration, the resistance reducing effect becomes particularly high.

In accordance with a desired aspect of the electrode for secondary battery disclosed herein, the coating ratio of the surface of the carbon nanotubes by coating with a material including the element with a higher electronegativity than that of carbon is smaller than the coating ratio of the surface of the carbon nanotubes by coating with a material including the element with a lower electronegativity than that of carbon.

With such a configuration, the resistance reducing effect becomes particularly high.

The secondary battery disclosed herein includes the above electrode for secondary battery.

With such a configuration, a secondary battery with a small resistance (particularly, initial resistance) is provided.

DESCRIPTION OF THE PREFERRED EMBODIMENTS

Embodiments of the present teaching will be described below. It should be noted that matters necessary for executing the present teaching, except for matters specifically referred to herein (e.g., a general configuration of an electrode not featuring the present teaching) can be recognized as design matters of those skilled in the art based on the related art in the present field. The present teaching can be executed based on the contents disclosed herein, and the technical common knowledge in the relevant field. Further, in the following accompanying drawings, the members and portions exerting the same function are given the same reference number and sign for description. Further, the dimensional relation (such as length, width, or thickness) in each drawing does not reflect the actual dimensional relation.

In the present description, the "secondary battery" is a term denoting an electric storage device capable of repeatedly charging and discharging in general, and including so-called electric storage elements such as a storage battery and an electric double layer capacitor.

Hereinafter, an embodiment in which the electrode for a secondary battery disclosed herein is an electrode for a lithium ion secondary battery will be specifically described with reference to the accompanying drawings.

Figure 1:
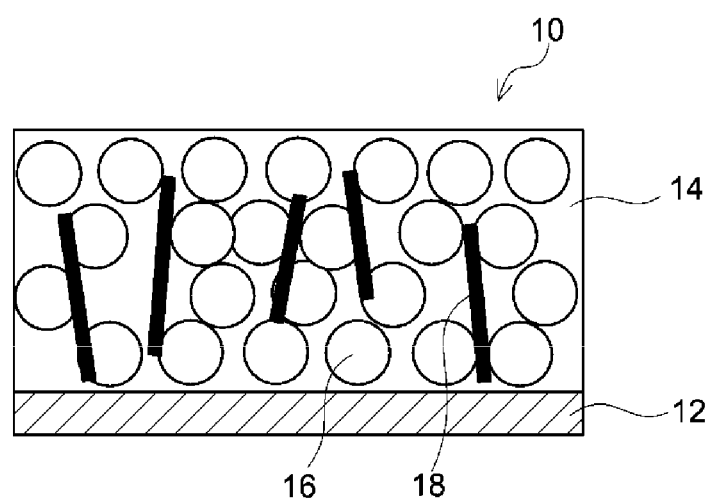
FIG. 1 is a schematic cross sectional view showing a part of an example of an electrode in accordance with one embodiment of the present teaching.

FIG. 1 is a schematic cross sectional view showing a part of the electrode in accordance with the present embodiment. As shown in FIG. 1, an electrode 10 in accordance with the present embodiment has a collector 12, and an active material layer 14 formed on the collector 12.

The collector 12 is typically a member made of a metal with good conductivity. As the collector 12, for example, a sheet-shaped member such as metal foil, a metal mesh, or a punching metal can be used.

When the collector 12 is a positive electrode collector, the collector 12 is desirably a member made of aluminum or an aluminum alloy, and more desirably aluminum foil.

When the collector 12 is a negative electrode collector, the collector 12 is desirably a member made of copper or a copper alloy, and more desirably copper foil.

The active material layer 14 includes an active material 16.

When the active material 16 is a positive electrode active material, examples thereof may include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), and lithium transition metal phosphoric acid compounds (e.g., $LiFePO_4$).

When the active material 16 is a negative electrode active material, examples thereof may include carbon materials such as graphite, hard carbon, and soft carbon; lithium titanate ($Li_4Ti_5O_{12}$:LTO); Si, and Sn.

Since the resistance reducing effect is particularly high, it is desirable in the present embodiment that the electrode 10 is a positive electrode and the active material 16 is a positive electrode active material (particularly, lithium transition metal oxide).

It should be noted that the electrode 10 in accordance with the present embodiment herein described is for a lithium ion secondary battery, but when the electrode 10 is formed as an electrode for other secondary batteries, the type of the active material may be appropriately selected.

The active material layer 14 includes carbon nanotubes 18.

As the carbon nanotubes 18, for example, single-walled carbon nanotubes (SWNT) or multilayer carbon nanotubes (e.g., double-walled carbon nanotubes (DWNT)), or the like can be used. These can be used in single species, or in combination of two or more species thereof.

The carbon nanotubes 18 may be a product manufactured by an arc discharge method, a laser ablation method, a chemical vapor deposition method, or the like.

The average length of the carbon nanotubes 18 is not particularly restricted. Even when the average length of the carbon nanotubes 18 is short, the resistance reducing effect can be obtained. When the average length of the carbon nanotubes 18 is long, the carbon nanotubes 18 tends to be aggregated, and not uniformly dispersed. Thus, the electron conductivity improving effects tend to be difficult to obtain.

For this reason, the average length of the carbon nanotubes 18 is desirably 100 μm or less, more desirably 75 μm or less, and further desirably 50 μm or less. On the contrary, when the average length of the carbon nanotubes 18 is short, the conductive path between the active materials tends to be difficult to form. For this reason, the average length of the carbon nanotubes 18 is desirably 1 μm or more, more desirably 2 μm or more, and further desirably 3 μm or more.

The average diameter of the carbon nanotubes 18 is not particularly restricted, and desirably 0.1 nm or more and 30 nm or less, and more desirably 0.5 nm or more and 20 nm or less.

The average length and the average diameter of the carbon nanotubes 18 can be determined, for example, as average values of the lengths and diameters of 30 or more carbon nanotubes 18 obtained by taking electron micrographs of the carbon nanotubes 18, respectively.

In the present embodiment, each of the carbon nanotubes 18 has a coating (not shown; also referred to as "first coating" hereinafter) of a material including an element with a higher electronegativity than that of carbon on at least a part of the surface thereof.

The material including an element with a higher electronegativity than that of carbon may be formed of one element, or may be formed of two or more elements.

The material including an element with a higher electronegativity than that of carbon may include only one element with a higher electronegativity than that of carbon, or may include two or more of the elements.

The material including an element with a higher electronegativity than that of carbon desirably consists of only an element with a higher electronegativity than that of carbon.

Examples of the element with a higher electronegativity than that of carbon may include N (3.04), F (3.98), Cl (3.16), Br (2.96), and I (2.66). Out of these, at least one selected from the group consisting of F, N, and Cl is desirable, at least one selected from the group consisting of F and Cl is more desirable, and F is most desirable in view of the particularly high electronegativity and the particularly high resistance reducing effect. It should be noted that the numbers described with the symbols of elements are values of the electronegativities of the elements.

Each of the carbon nanotubes may further has a coating of a material including an element with a lower electronegativity than that of carbon (not shown; also referred to as "second coating" hereinafter) in addition to the first coating. With this configuration, the resistance reducing effect became particularly high.

There is no particular restriction on position of the second coating so long as the second coating is formed on at least a part of the surface of each of the carbon nanotubes 18. However, from the viewpoint of not impairing the effect exerted by the first coating, the second coating is desirably formed at a portion on which the first coating is not formed on the surface of the carbon nanotubes 18.

Specific examples of the element with a lower electronegativity than that of carbon may include Ti (1.54), P (2.19), B (2.04), Si (1.90), Al (1.61), Zn (1.65), and W (2.36). Out of these, at least one selected from the group consisting of Ti, P, B, Si, Al, Zn, and W is desirable in view of the particularly high resistance reducing effect. It should be noted that the numbers described with the symbols of elements are values of the electronegativities of the elements.

The smaller the electronegativity of the element is, the larger the resistance reducing effect tends to be. For this reason, the electronegativity of the element is desirably 2.4 or less, more desirably 2.0 or less, and further desirably 1.8 or less.

The material including the element with a lower electronegativity than that of carbon may include only one element with a lower electronegativity than that of carbon, or may include two or more thereof.

The material including an element with a lower electronegativity than that of carbon may be formed of one element, or may be formed of two or more elements.

The material including an element with a lower electronegativity than that of carbon may include an element with a higher electronegativity than that of carbon in such a range as not to remarkably impair the effects exerted by the second coating. Examples of the element with a higher electronegativity than that of carbon may include 0 (3.44).

Accordingly, for example, the material including an element with a lower electronegativity than that of carbon may be an oxide of an element with a lower electronegativity than that of carbon. In this case, the element with a lower electronegativity than that of carbon becomes less likely to be leaked from the second coating, resulting in an improvement of the durability of the coating.

The second coating may include a binder such as acrylic resin.

The coating ratio (i.e., the coverage rate) of the surface of the carbon nanotubes 18 by the first coating is not particularly restricted. When the coverage rate is too low, the resistance reducing effect by the first coating tends to decrease. For this reason, the coverage rate is desirably 20% or more, more desirably 30% or more, and further desirably 40% or more. On the contrary, when the coverage rate is too high, the carbon nanotubes 18 functioning as a conductive path may be insulated. For this reason, the coverage rate is desirably 90% or less, more desirably 80% or less, and further desirably 70% or less. The coverage rate is most desirably 40% or more and 70% or less in view of the particularly high resistance reducing effect.

The coating ratio (i.e., the coverage rate) of the surface of the carbon nanotubes 18 by the second coating is not particularly restricted. When the coverage rate is too low, the resistance reducing effect by the second coating tends to decrease. For this reason, the coverage rate is desirably 5% or more, more desirably 10% or more, and further desirably 20% or more. On the contrary, when the coverage rate is too high, the carbon nanotubes 18 functioning as a conductive path may be insulated. For this reason, the coverage rate is desirably 50% or less, more desirably 40% or less, and further desirably 30% or less.

It should be noted that the coverage rate of the first coating may be larger or smaller than or equal to the coverage rate of the second coating. The coverage rate of the first coating is desirably smaller than the coverage rate of the second coating in view of the particularly high resistance reducing effect.

It should be noted that coverage rates of the carbon nanotubes 18 by the first coating and the second coating can be each determined by, for example, the following method. First, using an energy dispersive X-ray analysis device (EDS device), a cross-section EDS mapping image is acquired, and the element deposited at a carbon nanotube 18 is identified. Then, in the cross-section EDS mapping image, (total of the deposition distances of elements)/(entire circumferential length of carbon nanotube 18)×100 is calculated. The calculated value can be referred to as a coverage rate (%). Alternatively, the coverage rate (%) can also be determined using an electron probe micro analyzer (EPMA) in the same manner.

The first coating can be formed on the surface of the carbon nanotubes 18, for example, in the following manner.

When the element with a higher electronegativity than that of carbon is present as gas, the carbon nanotubes are placed under a gas atmosphere of the element with high electronegativity for a prescribed time. With this configuration, only the element with high electronegativity can be coated on the surface of the carbon nanotubes.

Another example of a method for forming the first coating includes, for example, preparing a dispersion of a nano-order sized particles of a material including an element with a higher electronegativity than that of carbon; immersing carbon nanotubes in the dispersion, and evaporating the dispersion medium from the dispersion by drying. During this procedure, a binder such as acrylic resin may be added to the dispersion for the purpose of improving the strength of the coating.

The second coating may be formed on the surface of the carbon nanotubes 18, for example, in the following manner.

For example, while rotating the carbon nanotubes, the constituent element of the second coating is vapor deposited. With this method, only an element with a low electronegativity can be coated on the surface of the carbon nanotubes.

Another example of a method for forming the second coating includes preparing a dispersion of a nano-order sized particles of a material including an element with a lower electronegativity than that of carbon (particularly, an oxide of an element with a lower electronegativity than that of carbon); immersing carbon nanotubes in the dispersion, and evaporating the dispersion medium from the dispersion by drying. A binder such as acrylic resin may be added to the dispersion for the purpose of improving the strength of the coating.

It should be noted that the order for forming the first coating and the second coating is not particularly restricted.

In the present embodiment, the carbon nanotubes 18 having the first coating are used as the conductive material of the active material layer 14. As a result, an electrode 10 with a small resistance can be obtained.

The reason for this is presumed as follows.

The first coating is formed of a material including an element with a higher electronegativity than that of carbon. For this reason, the surface of the first coating is negatively charged, and attracts cations (e.g., lithium ion $Li^+$) of a charge carrier. This action improves the conductivity of the cation of the charge carrier of the active material layer 14 including the carbon nanotubes 18, resulting in a smaller resistance of the electrode 10.

Further, by using the carbon nanotubes 18 having the first coating and the second coating as the conductive material of the active material layer 14, it is possible to obtain an electrode 10 with a still smaller resistance.

The reason for this is presumed as follows.

The second coating is formed of a material including an element with a lower electronegativity than that of carbon. For this reason, the surface of the second coating is partially positively charged, and attracts electrons. This action improves the electron conductivity of the carbon nanotubes 18, resulting in a smaller resistance of the electrode 10.

The active material layer 14 may include other components than the active material 16 and the carbon nanotubes 18. Examples thereof may include a binder and a thickener.

As the binder, for example, various polymer materials such as polyvinylidene fluoride (PVdF), polytetrafluoroethylene (PTFE), polyethylene oxide (PEO), and styrene butadiene rubber (SBR) can be used.

As the thickener, for example, carboxymethyl cellulose (CMC) can be used.

The active material layer 14 may include conductive materials (e.g., carbon black such as acetylene black (AB)) except for the carbon nanotubes 18 within the range not impairing the effect of the present teaching remarkably.

The content of the active material 16 is not particularly restricted, and is desirably 75 mass % or more, more desirably 80 mass % or more, and further desirably 85 mass % or more in the active material layer 14 (i.e., based on the total mass of the active material layer 14). Meanwhile, the content of the active material is desirably 99.8 mass % or lower, more desirably 99.5 mass % or lower, and further desirably 99 mass % or lower in the active material layer 14.

The content of the carbon nanotubes 18 is not particularly restricted, and is desirably 0.1 mass % or more, more desirably 0.3 mass % or more, and further desirably 0.5 mass % or more in the active material layer 14. Meanwhile, the content of the carbon nanotubes 18 is desirably 15 mass % or lower, more desirably 10 mass % or lower, and further desirably 5 mass % or lower in the active material layer 14.

The content of the binder is not particularly restricted, and is desirably 0.1 mass % or more and 10 mass % or lower, and more desirably 0.5 mass % or more and 8 mass % or lower in the active material layer 14.

The content of the thickener is not particularly restricted, and is desirably 0.1 mass % or more and 5 mass % or lower, and more desirably 0.5 mass % or more and 3 mass % or lower in the active material layer 14.

The electrode 10 in accordance with the present embodiment is for a secondary battery, desirably for a non-aqueous electrolytic solution secondary battery, and particularly desirably for a lithium ion secondary battery. In accordance with a known method, a secondary battery (particularly, a non-aqueous electrolytic solution secondary battery) can be constructed using the electrode 10 in accordance with the present embodiment. The secondary battery has small resistance (particularly, small initial resistance).

Thus, a specific configuration example of a lithium ion secondary battery using the electrode 10 in accordance with the present embodiment will be described below with reference to the accompanying drawings.

Figure 2:
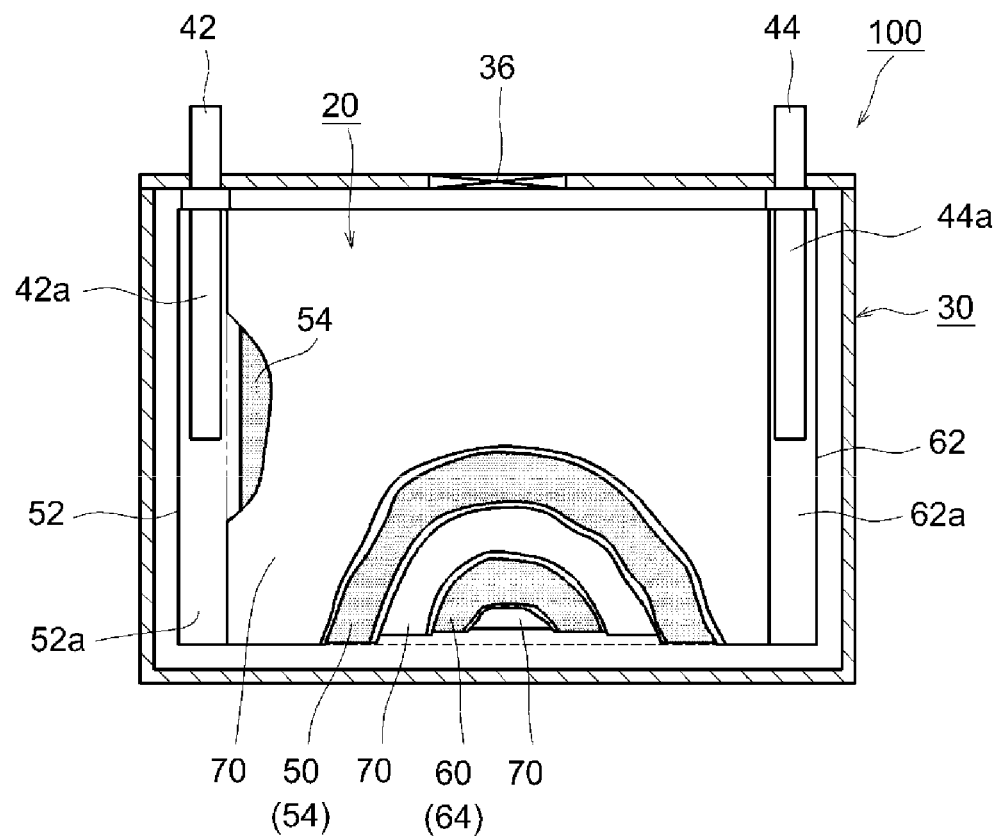
FIG. 2 is a cross sectional view schematically showing a configuration of a lithium ion secondary battery constructed using an electrode in accordance with one embodiment of the present teaching.

A lithium ion secondary battery 100 shown in FIG. 2 is a sealed type battery constructed by accommodating a flat-shaped wound electrode body 20 and a non-aqueous electrolyte (not shown) in a flat square battery case (i.e., an exterior container) 30. The battery case 30 is provided with a positive electrode terminal 42 and a negative electrode terminal 44 for external connection, and a thin-walled safety valve 36 set so as to relieve the internal pressure when the internal pressure of the battery case 30 increases to a prescribed level or higher. The positive and negative electrode terminals 42 and 44 are electrically connected with positive and negative electrode collector plates 42a and 44a, respectively. As the material for the battery case 30, for example, a metal material which is lightweight, and has a good thermal conductivity such as aluminum is used.

Figure 3:
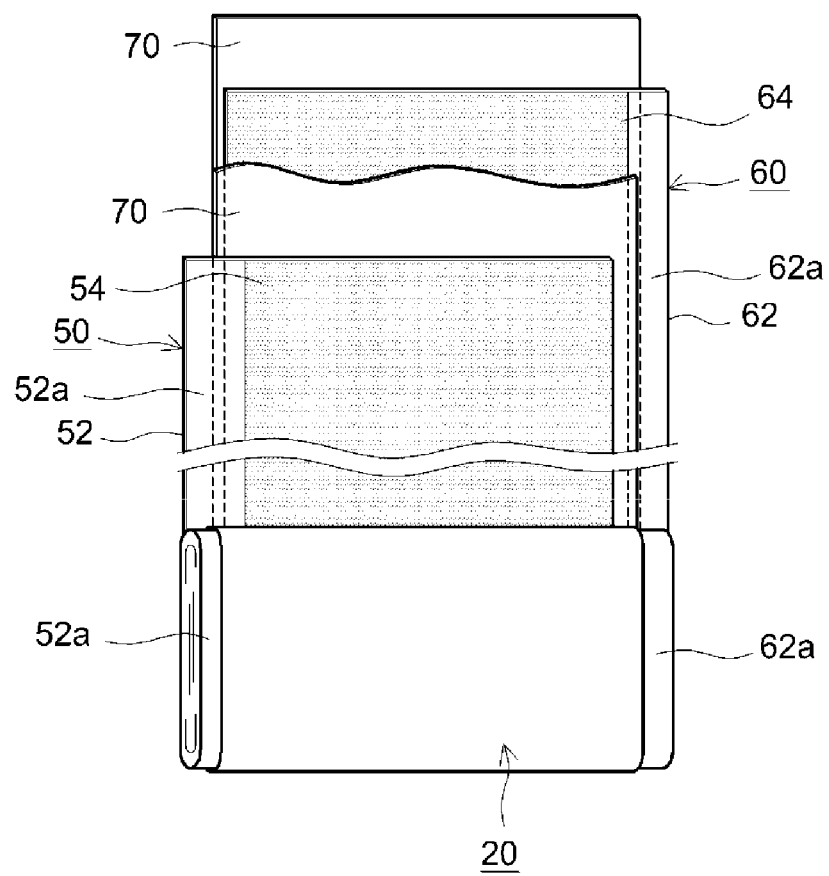
FIG. 3 is a schematic view showing a configuration of a wound electrode body of a lithium ion secondary battery constructed using an electrode in accordance with one embodiment of the present teaching.

For the wound electrode body 20, as shown in FIGS. 2 and 3, a positive electrode sheet 50 includes a positive electrode active material layer 54 formed along the longitudinal direction on one surface or both surfaces (both surfaces in this case) of a long-length positive electrode collector 52; and a negative electrode sheet 60 includes a negative electrode active material layer 64 formed along the longitudinal direction on one surface or both surfaces (both surface in this case) of a long-length negative electrode collector 62. The positive electrode sheet 50 and the negative electrode sheet 60 are stacked and wound in the longitudinal direction with two long-length separator sheets 70 interposed therebetween. It should be noted that a positive electrode collector plate 42a and a negative electrode collector plate 44a are bonded to a positive electrode active material layer non-formation part 52a (i.e., the portion of the positive electrode collector 52 exposed without formation of the positive electrode active material layer 54 thereon), and a negative electrode active material layer non-formation part 62a (i.e., the portion of the negative electrode collector 62 exposed without formation of the negative electrode active material layer 64 thereon) that are formed so as to extend off outwardly from both ends in the winding axial direction (denoting the sheet width direction orthogonal to the longitudinal direction) of the wound electrode body 20, respectively.

For each of the positive electrode sheet 50 and the negative electrode sheet 60, the electrode 10 in accordance with the present embodiment is used.

In the present example, for the positive electrode sheet 50, aluminum foil is used as the positive electrode collector 52, and the positive electrode active material layer 54 includes a positive electrode active material, carbon nanotubes, and a binder. The carbon nanotubes have the coating mentioned above.

In the present example, for the negative electrode sheet 60, copper foil is used as the negative electrode collector 62, and the negative electrode active material layer 64 includes graphite of a negative electrode active material, carbon nanotubes, a binder, and a thickener. The carbon nanotubes have the coating mentioned above.

It should be noted that in the present example, the electrodes 10 in accordance with the present embodiment are used for both the positive electrode sheet 50 and the negative electrode sheet 60, but, as for the lithium ion secondary battery 100, the electrode 10 in accordance with the present embodiment may be used for only one of the positive electrode sheet 50 and the negative electrode sheet 60. However, use of the electrodes 10 in accordance with the present embodiment for both the positive electrode sheet 50 and the negative electrode sheet 60 can provide a larger resistance characteristic-improving effect.

As the separators 70, the same various microporous sheets as those conventionally used for a lithium ion secondary battery can be used, and examples thereof may include a microporous resin sheet formed of a resin such as polyethylene (PE) or polypropylene (PP). Such a microporous resin sheet may be of a monolayer structure, or may be of a multilayered structure of double layer or more (e.g., a three-layered structure in which PP layers are stacked on both surfaces of a PE layer). The separator 70 may include a heat resistant layer (HRL).

As the non-aqueous electrolytic solution, the same ones as those for a conventional lithium ion secondary battery are usable. Typically, the one obtained by adding a support salt to an organic solvent (non-aqueous solvent) is usable. As the non-aqueous solvents, various organic solvents such as carbonates, ethers, esters, nitriles, sulfones, and lactones for use in the electrolytic solution of a general lithium ion secondary battery can be used without particular restriction. Specific examples thereof may include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). Such non-aqueous solvents may be used alone, or in appropriate combination of two or more thereof. As the support salt, for example, lithium salt such as $LiPF_6$, $LiBF_4$, or $LiClO_4$ (desirably $LiPF_6$) can be desirably used. The concentration of the support salt is desirably 0.7 mol/L or more and 1.3 mol/L or lower.

It should be noted that the non-aqueous electrolytic solution may include, for example, various additives of gas generators such as biphenyl (BP) or cyclohexyl benzene (CHB); film forming agents such as oxalato complex compounds including a boron atom and/or phosphorus atom or vinylene carbonate (VC); dispersant; thickeners; and other additives so long as the effects of the present teaching is not remarkably impaired.

The lithium ion secondary battery 100 is usable for various uses. The desirable uses may include a driving power source to be mounted in a vehicle such as a plug-in hybrid vehicle (PHV), a hybrid vehicle (HV), or an electric vehicle (EV). The lithium ion secondary batteries 100 can be used in a form of a battery back in which a plurality thereof are electrically connected with one another.

It should be noted that, as one example, the rectangular lithium ion secondary battery 100 including the flat-shaped wound electrode body 20 was described. However, a lithium ion secondary battery can also be formed as a lithium ion secondary battery including a stacked type electrode body. Alternatively, a lithium ion secondary battery can also be configured as a cylindrical lithium ion secondary battery, a laminate type lithium ion battery, or the like.

Alternatively, according to a known method, using the electrode 10 in accordance with the present embodiment, other secondary batteries (particularly, a non-aqueous electrolytic solution secondary battery) other than a lithium ion secondary battery can also be configured.

Examples regarding the present teaching will be described in detail hereinafter. However, it is not intended that the present teaching is limited to such examples.

Preparation of Coated Carbon Nanotubes

Carbon nanotubes subjected to the following coating A forming operation were used for Examples 1 to 11, 18, and 19, and carbon nanotubes subjected to the following coating A forming operation and coating B forming operation were used for Examples 12 to 17.

It was observed by cross-section EDS mapping that the element shown in Table 1 coated the carbon nanotubes. Further, the coverage rate was calculated from (total of deposition distances of element(s))/(entire circumferential length of carbon nanotube)×100. The results are shown in Table 1.

Formation of Coating A

Carbon nanotubes (CN) each having average lengths shown in Table 1, and manufactured by a chemical vapor deposition method was exposed under the gas atmosphere of the element shown in Table 1 (i.e., under a $F_2$ gas atmosphere, a $N_2$ gas atmosphere, a $Cl_2$ gas atmosphere, or a mixed gas atmosphere of $F_2$ and $N_2$) for a prescribed time, thereby forming a coating A of a material including an element with a higher electronegativity than that of carbon on the surface of each of the carbon nanotubes.

Formation of Coating B

A dispersion of an oxide of the element shown in Table 1 (e.g., titanium oxide in the case of Ti) was prepared. To the dispersion, a small amount of acrylic resin was dissolved as a binder. Into the dispersion, the carbon nanotubes having the coating A formed thereon were immersed. Thereafter, evaporation to dryness was performed, thereby forming a coating B of a material including an element with a lower electronegativity than that of carbon on the surface of the carbon nanotubes.

Study of Positive Electrode: Examples 1 to 18 and Comparative Example 1

Preparation of Positive Electrode $LiNi_{1/3}Co_{1/3}Mn_{1/3}O_2$ (LNCM) as a positive electrode active material powder, acetylene black (AB) as a conductive material, the coated carbon nanotubes (CN), which had been prepared as above, and polyvinylidene fluoride (PVDF) as a binder were mixed with N-methyl pyrrolidone (NMP) at a mass ratio of LNCM:AB:CN:PVDF=94:1.5:1.5:3, thereby preparing a positive electrode active material layer-forming paste. The paste was applied in a band shape onto both surfaces of an aluminum foil with a thickness of 15 μm, and was dried and pressed, thereby preparing a positive electrode.

Preparation of Battery for Evaluation

Spheroidal graphite (C) as a negative electrode active material, CMC as a thickener, and SBR as a binder were mixed with ion exchanged water at a mass ratio of C:CMC:SBR=98:1:1, thereby preparing a negative electrode active material layer forming paste. The paste was applied in a band shape onto both surfaces of a copper foil with a thickness of 10 μm, and was dried and pressed, thereby preparing a negative electrode.

Further, two separators (porous polyolefine sheets of a three-layered structure of PP/PE/PP with a thickness of 20 μm) were prepared.

The prepared positive electrode and negative electrode, and separators were stacked so that the separators were interposed between the positive and negative electrodes, and wound, to obtain a wound electrode body.

The prepared wound electrode body was housed in a battery case. Subsequently, a non-aqueous electrolytic solution was injected into the battery case, thereby producing a rectangular lithium ion secondary battery with a capacity of 5 Ah. Here, the non-aqueous electrolytic solution used above was a 1.0 mol/L solution of $LiPF_6$ as a support salt in a mixed solution including ethylene carbonate (EC), dimethyl carbonate (DMC), and ethyl methyl carbonate (EMC) at a volume ratio of EC:DMC:EMC=3:4:3.

In the manner described above, lithium ion secondary batteries for evaluation using electrodes of Examples 1 to 18 were obtained.

Meanwhile, a lithium ion secondary battery for evaluation using the electrode of Comparative Example 1 was obtained in the same manner as described above, except for using carbon nanotubes as it was (i.e., using an uncoated carbon nanotube).

Study of Negative Electrode: Example 19 and Comparative Example 2

Preparation of Negative Electrode

Spheroidal graphite (NA), the prepared coated carbon nanotube (CN), CMC as a thickener, and SBR as a binder were mixed with ion exchanged water at a mass ratio of NA:CN:CMC:SBR=96.5:1.5:1:1, thereby preparing a negative electrode active material layer forming paste. The paste was applied in a band shape onto both surfaces of a copper foil with a thickness of 10 μm, and was dried and pressed, thereby preparing a negative electrode.

Preparation of Battery for Evaluation

LiNi$_{1/3}$Co$_{1/3}$Mn$_{1/3}$O$_2$(LNCM) as a positive electrode active material powder, acetylene black (AB) as a conductive material, and polyvinylidene fluoride (PVDF) as a binder were mixed with N-methyl pyrrolidone (NMP) at a mass ratio of LNCM:AB:PVDF=94:3:3, thereby preparing a positive electrode active material layer-forming paste. The paste was applied in a band shape onto both surfaces of an aluminum foil with a thickness of 15 μm, and was dried and pressed, thereby preparing a positive electrode.

Further, two separators (porous polyolefine sheets of a three-layered structure of PP/PE/PP with a thickness of 20 μm) were prepared.

The prepared positive electrode and negative electrode, and separators were stacked so that the separators were interposed between the positive and negative electrodes and wound, to obtain a wound electrode body.

The prepared wound electrode body was housed in a battery case. Subsequently, a non-aqueous electrolytic solution was injected into the battery case, thereby preparing a rectangular lithium ion secondary battery with a capacity of 5 Ah. Here, the non-aqueous electrolytic solution used was a 1.0 mol/L solution of LiPF$_6$ as a support salt in a mixed solution including ethylene carbonate (EC), dimethyl carbonate (DMC), and ethyl methyl carbonate (EMC) at a volume ratio of EC:DM:EMC=3:4:3.

In the manner described above, a lithium ion secondary battery for evaluation using the electrode of Example 19 was obtained.

Meanwhile, a lithium ion secondary battery for evaluation using the electrode of Comparative Example 2 was obtained in the same manner as described above, except for using a carbon nanotube as it was (i.e., using an uncoated carbon nanotube).

Initial Resistance Evaluation

Each lithium ion secondary battery for evaluation was adjusted to a state of charge (SOC) of 50%, and then, was allowed to stand under 25° C. environment. At a current value of 100 Ah, 10-second discharging was performed. The voltage value after the lapse of 10 seconds from start of discharging was measured, and the initial battery resistance was calculated. The ratio, when the resistance of the lithium ion secondary battery for evaluation of Comparative Example 1 was taken as 100, of each resistance of other lithium ion secondary batteries for evaluation was determined (i.e., the ratio was determined in terms of percentage). The results are shown in Table 1.

TABLE 1

|  | CN-containing electrode | Element of coating A | Element of coating B | CN average length (μm) | Coverage rate of coating A (%) | Coverage rate of coating B (%) | Initial resistance ratio (%) |
| --- | --- | --- | --- | --- | --- | --- | --- |
| Ex. 1 | Positive electrode | F | — | 10 | 50 | — | 70 |
| Ex. 2 | Positive electrode | N | — | 10 | 50 | — | 75 |
| Ex. 3 | Positive electrode | Cl | — | 10 | 50 | — | 70 |
| Ex. 4 | Positive electrode | F | — | 1 | 50 | — | 70 |
| Ex. 5 | Positive electrode | F | — | 3 | 50 | — | 70 |
| Ex. 6 | Positive electrode | F | — | 50 | 50 | — | 70 |
| Ex. 7 | Positive electrode | F | — | 100 | 50 | — | 80 |
| Ex. 8 | Positive electrode | F | — | 10 | 30 | — | 80 |
| Ex. 9 | Positive electrode | F | — | 10 | 40 | — | 72 |
| Ex. 10 | Positive electrode | F | — | 10 | 70 | — | 72 |
| Ex. 11 | Positive electrode | F | — | 10 | 80 | — | 95 |
| Ex. 12 | Positive electrode | F | Ti | 10 | 10 | 40 | 60 |
| Ex. 13 | Positive electrode | F | Ti | 10 | 20 | 30 | 50 |
| Ex. 14 | Positive electrode | F | Ti | 10 | 25 | 25 | 65 |
| Ex. 15 | Positive electrode | F | Ti | 10 | 30 | 20 | 66 |
| Ex. 16 | Positive electrode | F | Ti | 10 | 40 | 10 | 67 |
| Ex. 17 | Positive electrode | F | W | 10 | 20 | 30 | 65 |
| Ex. 18 | Positive electrode | F, N | — | 10 | 50 | — | 72 |
| Ex. 19 | Negative electrode | F | — | 10 | 50 | — | 80 |

TABLE 1-continued

|  | CN-containing electrode | Element of coating A | Element of coating B | CN average length (μm) | Coverage rate of coating A (%) | Coverage rate of coating B (%) | Initial resistance ratio (%) |
|---|---|---|---|---|---|---|---|
| Comp. Ex. 1 | Positive electrode | — | — | 10 | — | — | 100 |
| Comp. Ex. 2 | Negative electrode | — | — | 10 | — | — | 110 |

Ex.: Example
Comp. Ex.: Comparative Example

The results of Examples 1 to 3 and Comparative Example 1 indicate that use of a carbon nanotube having the coating A decreased the initial resistance.

Results of Example 1 and Examples 4 to 7 indicate that when the average length of carbon nanotubes is 50 μm or less, the resistance reducing effect is particularly high. This is considered due to the following: even when the average length of the carbon nanotube is short, the lithium ion attracting effect of the coating A is sufficiently exerted; whereas, an increase in length of the carbon nanotube causes aggregation of the carbon nanotubes, so that the resistance reducing effect tends to decrease.

The results of Example 1 and Examples 8 to 11 indicate that when the coverage rate of the coating A is 40% or more and 70% or less, the resistance reducing effect is particularly high. This is considered due to the following: a decrease in coverage rate tends to reduce the resistance reducing effect by the coating A; and an increase in coverage rate increases the effect of insulation of the point of contact between the active material and the carbon nanotube by the coating A.

The results of Examples 12 to 17 indicate that use of the carbon nanotube having the coating B of a material including an element with a lower electronegativity than that of carbon in addition to the coating A resulted in a smaller initial resistance. This is considered due to the fact that the coating B of a material including an element with a lower electronegativity than that of carbon can enhance the electron conductivity. Further, when the coverage rate of the coating A was lower than the coverage rate of the coating B, it was possible to obtain a higher resistance reducing effect. This is considered due to the following: the element with a higher electronegativity than that of carbon such as fluorine has much higher electronegativity than that of carbon; accordingly, the cation attracting effect is sufficiently exerted even with a small amount of coating; for this reason, the lithium ion conductivity improving effect of the coating A and the electron conductivity improving effect of the coating B are excellent with good balance.

From the results of Example 18, even when the material coating the carbon nanotube included a plurality of elements with higher electronegativity than that of carbon, the resistance reducing effect was observed.

The results of Example 19 and Comparative Example 2 indicate that even when a carbon nanotube coated with a material including an element with a higher electronegativity than that of carbon was used for the negative electrode, the initial resistance decreased, and the increase in resistance after high-temperature storage was also suppressed.

Up to this point, specific examples of the present teaching were described in detail. However, these are merely examples, and do not limit the scope of the appended claims. The technology described in the appended claims includes various modifications and changes of the specific examples exemplified up to this point.

What is claimed is:

1. An electrode for a secondary battery, comprising:
   a collector; and
   an active material layer formed on the collector,
   wherein the active material layer includes an active material and carbon nanotubes,
   each of the carbon nanotubes has a coating of a material including an element with a higher electronegativity than that of carbon on at least a part of the surface thereof,
   an average length of the carbon nanotubes is 1 μm or more and 50 μm or less;
   an average diameter of the carbon nanotubes is 0.1 nm or more and 30 nm or less;
   a content of the carbon nanotubes is 0.1 mass % or more and 15 mass % or lower in the active material layer; and
   a coating ratio of the surface of the carbon nanotubes by coating with the material including the element with a higher electronegativity than that of carbon is 20% or more and 90% or lower.

2. The electrode for a secondary battery according to claim 1,
   wherein the element with a higher electronegativity than that of carbon is at least one selected from the group consisting of F, N, and Cl.

3. The electrode for a secondary battery according to claim 1,
   wherein the electrode for a secondary battery is a positive electrode, and the active material is a positive electrode active material.

4. The electrode for a secondary battery according to claim 1,
   wherein the coating ratio of the surface of the carbon nanotubes by coating with the material including the element with a higher electronegativity than that of carbon is 40% or more and 70% or lower.

5. The electrode for a secondary battery according to claim 1,
   wherein each of the carbon nanotubes further has a coating of a material including an element with a lower electronegativity than that of carbon.

6. The electrode for a secondary battery according to claim 5,
   wherein the element with a lower electronegativity than that of carbon is at least one selected from the group consisting of Ti, P, B, Si, Al, Zn, and W.

7. The electrode for a secondary battery according to claim 5,
   wherein the coating ratio of the surface of the carbon nanotubes by coating with the material including the element with a higher electronegativity than that of carbon is smaller than the coating ratio of the surface of the carbon nanotube by coating with the material including the element with a lower electronegativity than that of carbon.

8. A secondary battery comprising the electrode for a secondary battery according to claim 1.

\* \* \* \* \*